March 3, 1953 A. N. GOLDSMITH 2,630,542

MULTICOLOR TELEVISION

Filed July 19, 1947 4 Sheets-Sheet 1

INVENTOR
ALFRED N. GOLDSMITH.
BY Samuel B. Smith
ATTORNEY

March 3, 1953 A. N. GOLDSMITH 2,630,542

MULTICOLOR TELEVISION

Filed July 19, 1947 4 Sheets-Sheet 2

INVENTOR
ALFRED N. GOLDSMITH.
BY Samuel D. Smith
ATTORNEY

March 3, 1953 A. N. GOLDSMITH 2,630,542

MULTICOLOR TELEVISION

Filed July 19, 1947 4 Sheets-Sheet 3

INVENTOR
ALFRED N. GOLDSMITH.
BY Samuel D. Smith
ATTORNEY

March 3, 1953 A. N. GOLDSMITH 2,630,542

MULTICOLOR TELEVISION

Filed July 19, 1947 4 Sheets-Sheet 4

INVENTOR

ALFRED N. GOLDSMITH.

BY Samuel B. Smith.

ATTORNEY

Patented Mar. 3, 1953

2,630,542

UNITED STATES PATENT OFFICE 2,630,542

MULTICOLOR TELEVISION

Alfred N. Goldsmith, New York, N. Y., assignor to Radio Corporation of America, New York, N. Y., a corporation of Delaware Application July 19, 1947, Serial No. 762,175

33 Claims. (Cl. 313—70)

This disclosure is a continuation-in-part of U. S. application Serial No. 548,239, filed August 5, 1944.

The invention herein described relates to multicolor television and particularly to improvement in cathode-ray color tubes of the image-pickup (or "camera") and image-reproducing (or "kinescope") varieties.

In connection with apparatus of this type wherein images are scanned and reproduced in colors closely approximating those of the original subject of the scanned images, use is frequently made of the so-called additive color combination process.

To this end, two or three, or even more, selected color components are utilized, and by suitable superpositioning in registry of a group of luminous color component images, whether multicolor, tricolor, or bicolor, thus securing reproduction in selected primary, supplementary, or key colors, the resultant image produced is found to correspond very closely to the original image in its natural colors, and to provide a reasonably acceptable approach to the natural luminous colors and color gradations of the original image.

In a companion United States patent application, Serial No. 548,238, filed August 5, 1944 (now U. S. Patent 2,481,839, issued September 13, 1949), and entitled "Color Television," this applicant has disclosed a form of color television system wherein a structure of the so-called monoplane type was scanned by individual electron beams to produce individual component color images, from which a combined image of the character above mentioned might be developed.

The present disclosure is related, generally speaking, to the same general form of apparatus, and is also for the purpose of providing for additive color combinations, so that a desired color image closely approximating the original may be had. Broadly speaking, however, the present invention, while dealing with and relating to corresponding beam deflection means, as explained in the said companion application, also deals with and relates to means and methods for minimizing discrepancies which otherwise might arise between the various component images which are normally displayed in superposition in any additive television or color method, whether the method be cyclic or sequential or simultaneous.

Since the method of the present disclosure is of the same general character as that of the companion case hereinabove referred to, reference may be had to the said companion application for details not specifically covered herein, in that they are adequately and completely set forth by the said companion application.

For purposes of distinction between the method and apparatus and system of the companion application mentioned and the present disclosure, it may be assumed that the companion application deals with and relates to a so-called form of system which might be characterized as a monoplane system, as contrasted with this disclosure which will be considered as being of the biplane type. Generally speaking, the generic features of the invention are set forth in the companion application although, broadly speaking, this invention utilizes and provides a system of television wherein there is provided a supporting surface upon which are carried multiplicities of primary or component color producing areas which are systematically located on the said target or screen surface; and with each of the said multiplicities of elements being so activated by electron impact and so associated with the color-image separation circuits of a receiver as to produce luminescence or fluorescence in the corresponding one of various selected component colors under the impact of a scanning or control electron beam. The produced separate colors and the thereby constituted images then combine in additive relationship to form, by virtue of the restriction of the impact of the scanning beams to different areas of the target, the multiplicities of component color images and the resulting natural color image.

It was explained in the companion case that, under some circumstances, boundary distortions result because of the angle of beam impact upon the target area. Accordingly, provision has been made in this disclosure for annulling and correcting such distortion in order that accurate registry may be provided.

To provide a concrete example of one form of system from which the invention may be considered, a tricolor additive color combination will be assumed, and, to this end, the three chosen colors, which for reference purposes may be considered as the component or even primary colors, will be red, green, and blue, so that when the correspondingly colored images are viewed additively and superimposed, the desired color combination will be had.

It was above pointed out that in the general arrangement of this invention the separate color component images were produced by the luminescent or fluorescent effects which resulted from the impact of separate scanning beams on a color-screen. In refinements of this invention there is provided, in a space between the color-screen and the points from which the scanning ray beams originate, an electron-opaque surface or "mask" which is slightly separated from the color-screen, and the electron-opaque surface is perforated with a plurality or multiplicity of orifices or apertures systematically so located in reference to the combined multiplicities of elementary surfaces on the color-screen that an electron beam emanating from any one of the plurality of electron beam sources may be projected into the orifices or apertures in such a way as to impact one group only of the multiplicities of light producing areas on the screen.

It is not always essential that the electron opaque masking element be formed with apertures to determine the points or areas thereof through which the scanning electron beams can penetrate. In some instances it is desirable that the mask be formed from solid material of various varieties, since these often lend themselves more readily to meeting problems of tube construction and the like. In some instances such masks are formed by supporting or depositing metallic elements on a thin sheet of insulating material so that portions of the material remain uncovered and form electron permeable areas, while the coated portions form areas which become electron opaque. In other forms the thickness of the mask structure itself may determine whether or not the material has relatively high electron transmissibility or relatively low electron transmissibility so that the low electron transmissibility sections become substantially impermeable to electron passage. In still other forms the electron opaque masking area may be formed of substantially uniform thickness but may be chemically changed either by electron beam impact or chemical means, such as the application of a chemically active fluid, vapor, or gas, or otherwise so that the transmissibility of the electron beam is varied as the beam moves from section to section or area to area.

The electron-opaque surface which is provided with the apertures or orifices serves, generally speaking, to mask, for instance, the green and the blue responsive multiplicities of areas from the influence of the red producing scanning ray. Similarly, the scanning ray which produces the green color effects upon beam impact influences the support surface which carries the multiplicities of luminescent areas in such a way that it cannot produce red or blue luminescent effects because of the general arrangements of the orifices relative to the source of such an electron beam. Consequently, the electron-opaque surface of the invention constitutes a masking or color defining element to some extent, and thus serves in a measure to improve the simplicity with which color images are reproduced.

To this end, this invention has as one of its objects that of providing an impacted target surface wherein separate electron beams emanating from separate sources may be directed thereupon to produce simultaneously or in sequence color images in lights of selected component colors, which may add together to produce a desired image of substantially natural colors.

Other objects of this invention are to provide for producing color television images by purely electric means and without the need of any mechanical moving parts, such as color filters which have been used heretofore in connection with the so-called three-color television systems.

Other objects of the invention are those of providing a system for producing television images in color which is readily adaptable to receiving signals representative of the several colors, whether those signals be transmitted simultaneously, or in sequence, or in a predetermined cyclic manner.

Another object of this invention is that of producing multi- or three-color images upon a target area of a single cathode ray tube where the produced color images may be viewed directly or by various projection methods known in the art to provide enlarged television images. As was set forth in the companion case, many means have been explained for accomplishing the desired enlargement and, among these found particularly adaptable to use for the system herein set forth, are those which have been suggested by patents granted to Landis, Ramberg, Epstein, and others, of which the following patents are cited by way of example: Nos. 2,273,801; 2,298,808 and 2,295,779.

A further object of this invention is that of providing a system for producing color television images in any desired number of color combinations in the production of one complete television image, so that the system is not predicated upon a consideration that the patterns of the scanning of all of the component colors be identical, but whether identical or different, compensation for distortion is provided in such a manner that exact registry of the image elements is achieved at all times.

Other objects of the invention are those of providing for overcoming one or more of the known defects of prior art systems and, at the same time, providing a system of television wherein greater efficiency of image production results, and wherein higher fidelity of color, color gradation, and color picture registry is at all times had.

Still other objects will become apparent and suggest themselves to those skilled in the art to which the invention is directed when the following specification is read in conjunction with the drawings, wherein, Fig. 1 shows schematically one form of image producing tube and the control system therefor;

Figure 1:
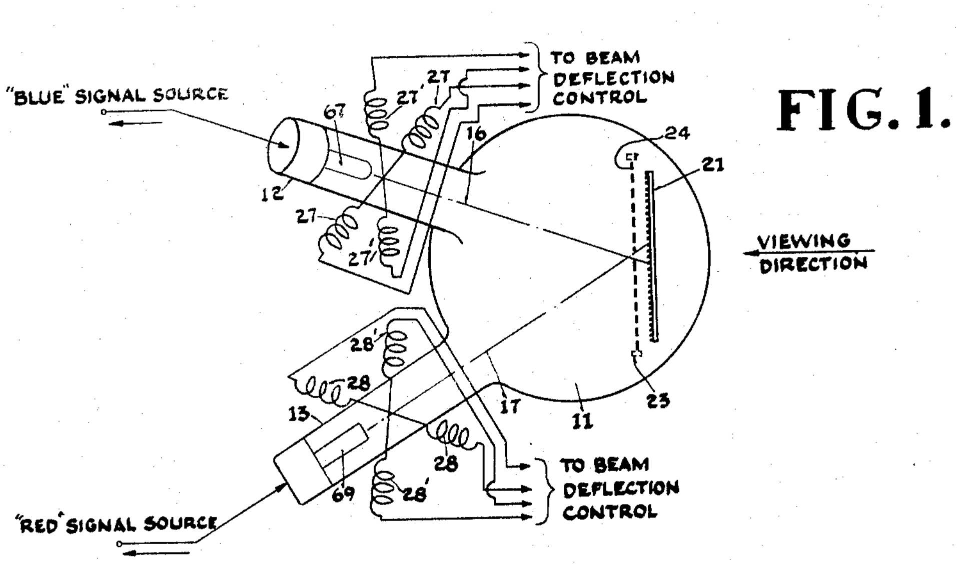
Figure 2:
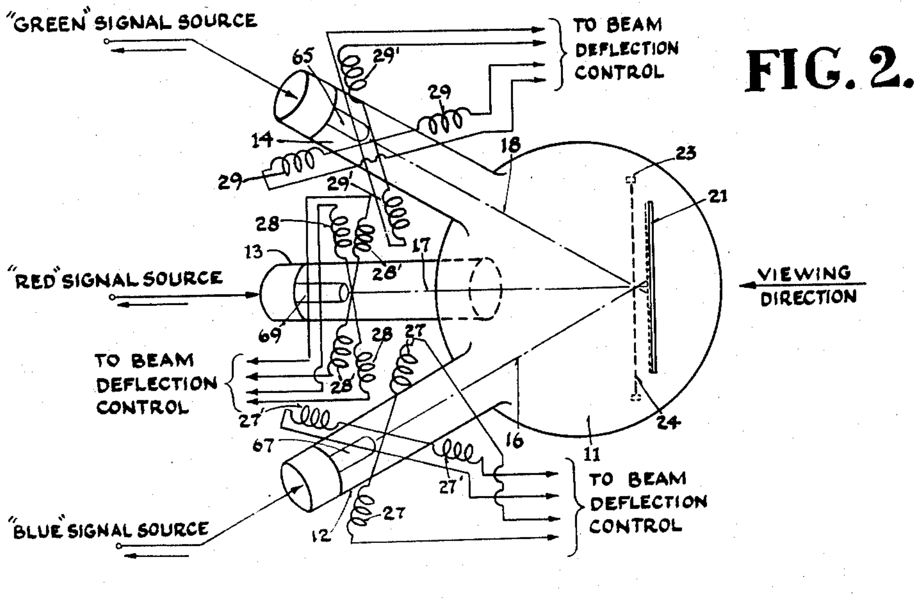
Fig. 2 is a view of the arrangement of Fig. 1, viewed from a slightly different angle to show three separate controls.
Figure 3:
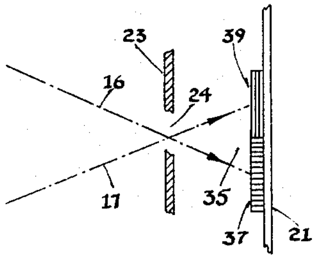
Fig. 3 is an enlarged view of a portion of the arrangements of Fig. 1 or 2 to illustrate schematically the electron beam passage to the target area through the apertured mask.
Figure 4:
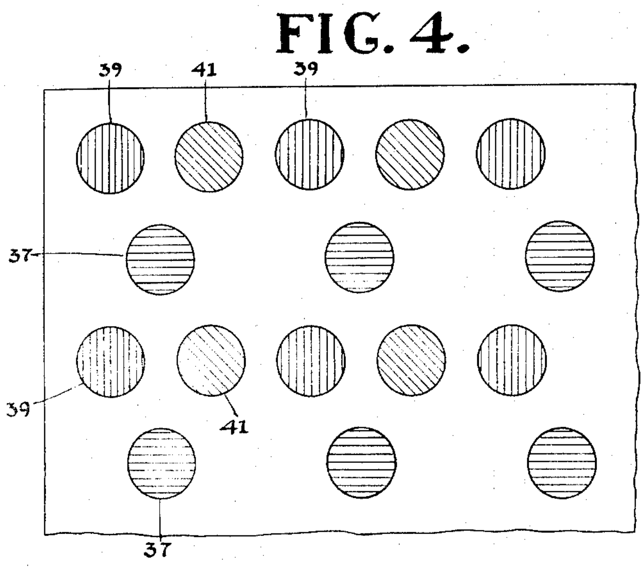
Figure 5:
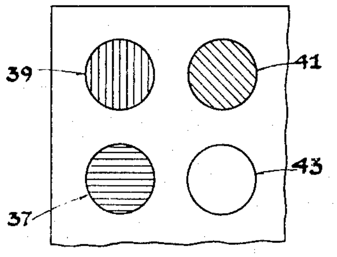
Figure 6:
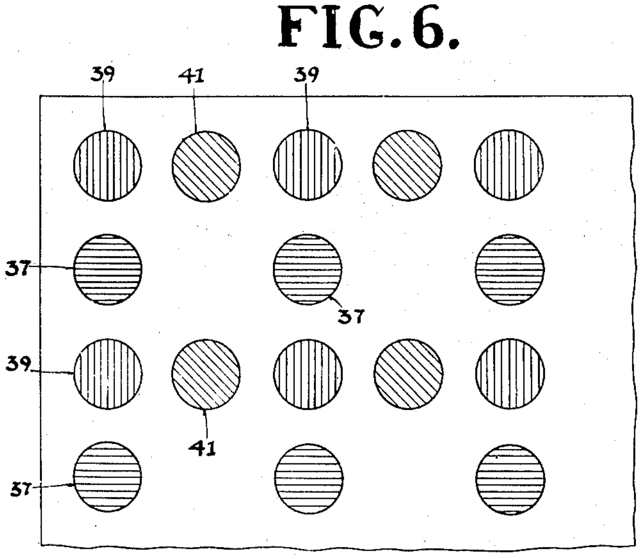
Figure 11:
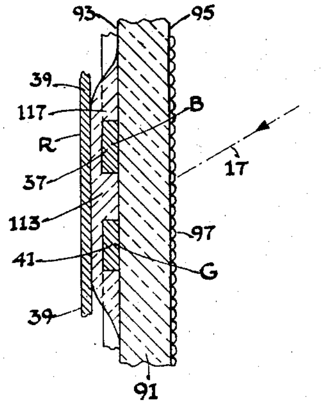
Figure 7:
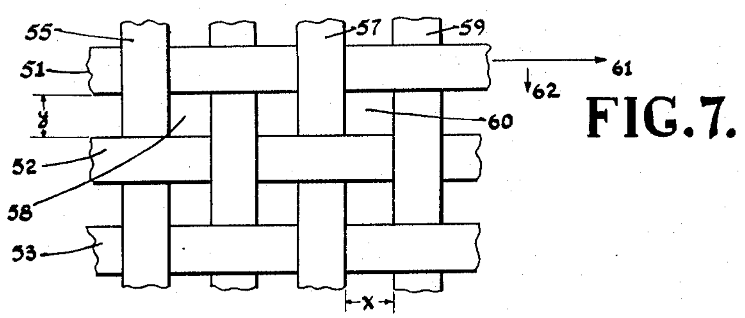
Figure 8:
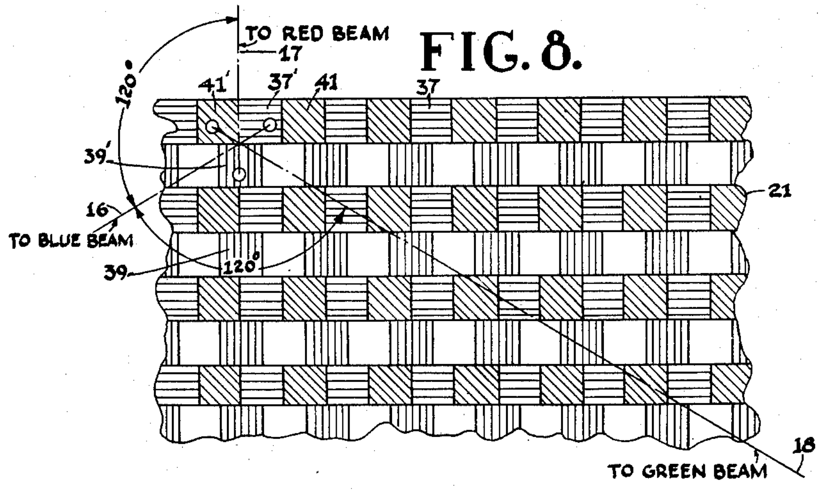
Figure 9:
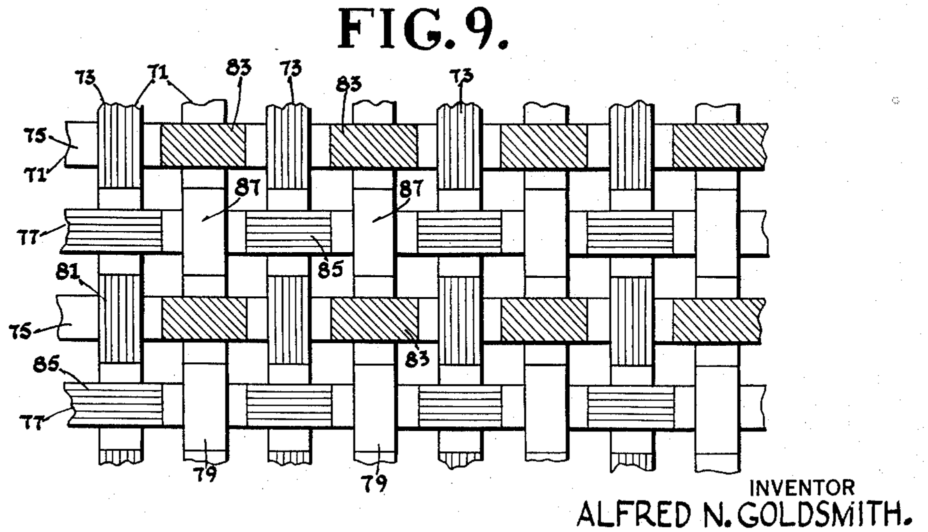
Figure 10:
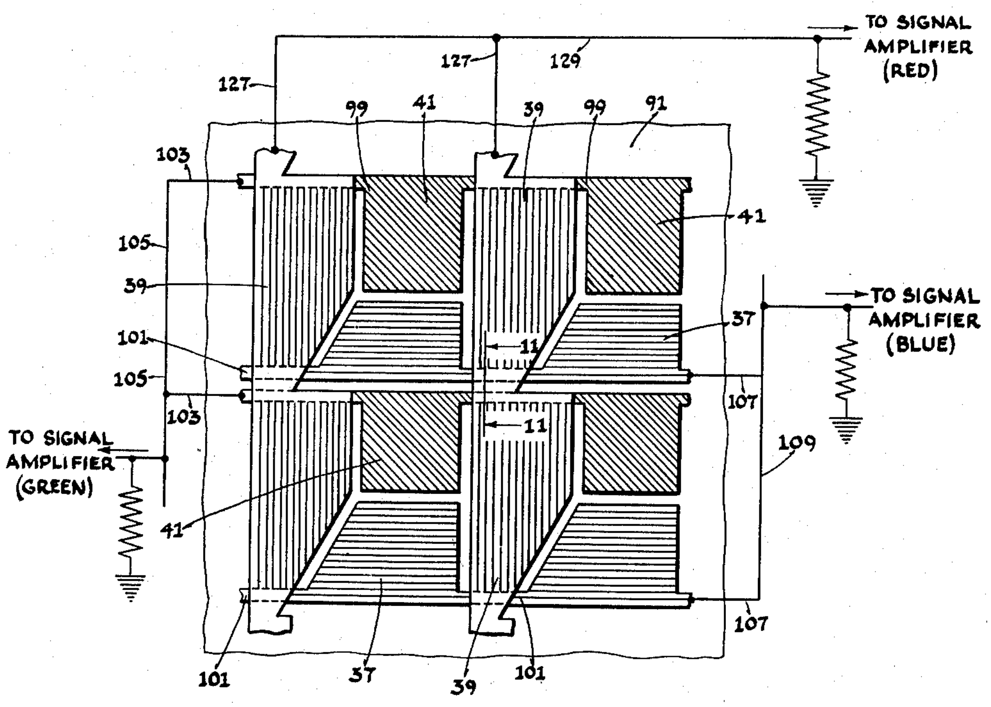
Figure 12:
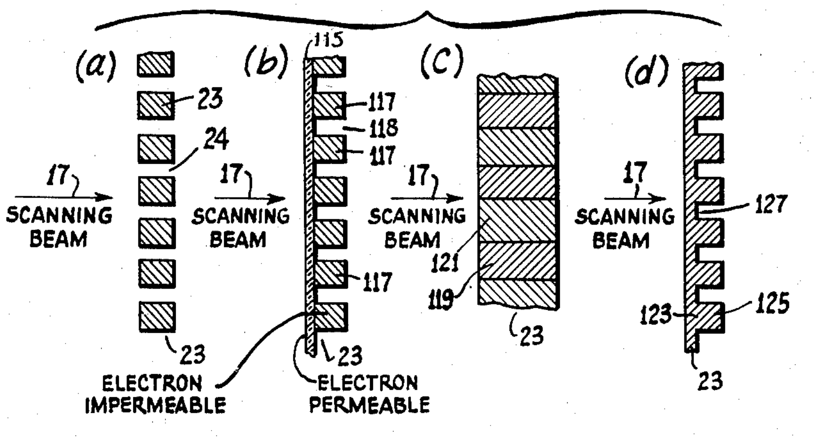

All of Figs. 4, 5 and 6 schematically illustrate the general arrangement of the various colored luminescent or fluorescent elements on the target area;

Fig. 7 schematically represents one masking system and method by which the target areas may be coated;

Fig. 8 represents, in schematic manner, the general arrangement by which the various electron beams impact different colored fluorescent areas;

Fig. 9 represents schematically a modification of the target arrangement from that shown by Figs. 4, 5, and 6 particularly;

Fig. 10 illustrates schematically a modification of the arrangement of the target area from that shown by Fig. 8 for instance, by which the system becomes particularly adapted for use as an image transmitting tube;

Fig. 11 is a section along the line 11—11 of Fig. 10;

Fig. 12 shows by parts (*a*), (*b*), (*c*) and (*d*) various forms of mask elements which are usable with the arrangement depicted particularly by Figs. 1, 2 and 3 as the masking elements. In this figure portion (*a*) indicates what will be termed a unitary form of mask, (*b*) indicates what will be termed the binary form of mask, and portions (*c*) and (*d*) indicate what will be termed the composite forms of masks, of which portion (*c*) discloses a mask incorporating different materials to provide different effects, and portion (*d*) establishes the control by virtue of a thickness variation.

Referring now, very generally, to the drawings, it will be seen that the tubes pictorially represented by Figs. 1 and 2 are of a nature closely resembling the tubes shown particularly by the aforementioned U. S. Patent 2,481,839 entitled "Color Television" which was filed August 5, 1944, as Serial No. 548,238. In connection with the showing of Figs. 1 and 2, it is to be appreciated that the representation of the internal structure of the tube is shown in a most schematic manner and that the general formation of the tube electrodes, the mask and the target area is more particularly exemplified by the remaining figures of the disclosure.

In the arrangement of Fig. 1, there is included the bulbous envelope member 11 having also a plurality of neck portions 12, 13 and 14 from which the three scanning beams corresponding to images of selected component colors emanate, as was disclosed in the above mentioned application. Within the neck portions 12, 13 and 14 there are included suitable electron guns for developing the scanning beams 16, 17 and 18 which are to be directed upon the target area 21 whereat an observer, viewing the tube in the direction of the arrow (for instance), is able to view a picture or image in three selected component colors, such as red, green, and blue, for example, which additively shall combine to approximate the natural color image directed upon one or more analyzing tubes of a transmitter.

So considered, the various electron beams 16, 17 and 18, as mentioned in the application above designated, are directed from oblique positions toward the target or screen which is to be viewed. In the form more particularly shown by this arrangement, the target area itself is formed from a multiplicity of elemental sections which luminesce or fluoresce in the selected component colors, as will be set forth more particularly by Figs. 4 through 6 and 9, to which reference will later be made.

Interposed intermediate the electron beam sources and the target area 21 there is included an electron-opaque barrier element or mask 23 which is appropriately perforated, as conventionally shown by Figs. 1 and 2, so as to have a substantial number of systematically located openings or apertures 24 which are arranged to line up with the electron beam sources contained within the several neck portions of the tube in such a way that each of the independent scanning beams 16, 17 and 18 will pass through certain of the apertures or openings in such directions and with such locations of impact on the fluorescent screen as to form a single set of elementary component color surfaces on the target to all intents and purposes. To this end it is meant that the scanning beams 16, 17 and 18, respectively, when projected through the holes or apertures 24 in the electron-opaque barrier or mask 23, will be able to reach the target or screen area 21 along such paths that the independent electron beams are able to impinge upon only appropriately selected sections or elemental areas of the luminescent coatings.

For instance, if it be assumed that the electron beam 17, which emanates from within the neck portion 13 of the tube, shall be adapted to produce the image representative of the red components of the picture or image from the target surface 21, then it will be appreciated that the holes or apertures 24 in the electron-opaque barrier or mask 23 are so arranged relative to the electron beam 17 that, in all of its positions of deflection, the scanning beam 17, when passing through any one aperture, will be able to impinge upon the target or screen area 21 to influence only those luminescent sections or areas of the target which produce the red image.

Similarly, if it be assumed that the electron beam 16 produces the blue image, then it will be appreciated that the said beam, when passing through any of the apertures 24 of the mask 23, can impinge upon the target or screen area 21 in such a manner as to influence only the blue responsive areas of the target to the exclusion of both the green and red.

Various modifications of the mask arrangement, particularly depicted at 23 in Figs. 1, 2 and 3, have been illustrated by the arrangements of Fig. 12. Referring first to Fig. 12*a* there is disclosed a mask of the so-called unitary type substantially like that shown as a part of the arrangement of Fig. 3 in which the mask is formed of material which is opaque to electron passage and having appropriately positioned therein areas or points through which electrons may freely pass, such as has been designated, by way of example, by apertures 24.

In the modification of Fig. 12*b* there is shown an arrangement of the so-called binary type of mask element in which there is an electron permeable sheet, conventionally represented at 115, and used to support electron impermeable material conventionally represented at 117. The spaces shown at 118 between the different sections 117 permit electrons of the scanning beam represented at 17, for instance, to penetrate through the electron permeable sheet 115 and emerge in the areas represented at 118 to impinge upon any target area located to the right thereof as the drawing is viewed. A mask of the character shown by portion (*b*) of Fig. 12 may be formed by depositing or otherwise supporting metallic elements on an extremely thin sheet which is of the type and thickness frequently used and known as a Lenard window. For example, the electron impermeable material could be formed by a heavy metallic ink and printed directly on to the mica support. Also, the portions of 117, 118 might be formed from any type of metal, such as an extremely fine mesh of wire which could be aluminum, iron, or other metal or in various other physical forms and such mesh or the like, for instance, secured to the mica base by De Khotinsky cement or other appropriate sealing material used in high-vacuum apparatus. These are but two of the many ways to form a mask of the character disclosed.

The arrangement shown by portions (*c*) and (*d*) of Fig. 12 represent what might be termed a composite form of mask element. The form of mask of portion (*c*) of Fig. 12 is one wherein the electron beam transmission is varied or controlled as to its electrochemical characteristics under the influence of an electron beam. In this arrangement the mask is made up from small sections, such as those represented at 119 and 121. These sections, like those sections marked at 117 in portion (b) of Fig. 12 are shown in the drawings in one dimension only and the end of the section toward which the electron scanning beam 17 impinges may be made, for instance, in either rectangular or square cross-section so that looking at the sections from the direction along which the beam impinges the ends will be somewhat like those shown at 37, 41 and so on in Fig. 8. In each representation of Fig. 12, of course, the thickness of the section has been greatly exaggerated, for purposes of illustration, as have all dimensions. The showings in the figure are intended only to represent in a schematic manner the general principles and have no regard whatever to the actual size of the construction. The mask of Fig. 12c, for example, might consist of such materials as are chemically changed to reduce one section 121, for instance, to a metal form from a salt of a metal. Conversely, a salt or other compound of a metal may be chemically formed in the selected sections of the mask. Thus, there will be provided oxides or salts of the selected metals which will have either greater or lesser electron permeability than the metal itself, as the case may be. The other section will not be affected by the electron beam. Then, one of the sections 119 or 121 is electron permeable, and the other is electron impermeable.

In the form in which the composite type of mask is shown at portion (d) of Fig. 12, it will be seen that some sections 125 are relatively thick and other sections or areas 127 are relatively thin. With the scanning beam 17 directed toward the composite section 123 from the direction shown, it will be appreciated that the thick sections may be regarded as impermeable to the electron beam, whereas the less thicker sections 127 are sufficiently permeable to the electron beam to permit it to pass through to the target area located therebeyond and indicated, for instance, relative to the mask 23, as a whole, in Fig. 3, by the coatings 37, 39, for instance, carried upon the base or foundation member 21. Here again, the relative showings of the thick and the thin portions of the general mask structure 123 are illustrative only and, for instance, the thin portions 127 might readily coincide with the apertures 24 shown in the mask 23 of Fig. 3 and the thick portions 125 would then correspond to the barrier sections of the mask 23. In all instances the size of the section, aperture or area through which the electrons may penetrate may be controlled in formation by well known etching processes. This, for instance, may be done by printing a chemically protective pattern on the surface (such as a wax pattern) and then applying the desired reagent for a suitable length of time. Methods of this type are too well known to require further explanation.

Accordingly, where separate deflection systems are provided for deflecting each of the electron beams 16, 17 and 18, and where each of the electron beams 16, 17 and 18 are subjected to a modulation or intensity control in accordance with a received signal representative of one only of the selected component colors, it will be appreciated that the screen or target area 21 is excited by these electron beams in such a way that the desired color image is made visible.

Where proper registration of the scanning patterns traced by each of the scanning beams over the target area 21 is provided, it becomes evident that the several component color images produced by the scannings will be in register and, accordingly, the several component color images may be additively combined to produce a substantially natural-color resultant image.

Generally speaking, it is preferable to arrange the deflection controls for each of the scanning beams independently and, to this end, the deflection systems for controlling each beam are conventionally represented in the illustrations of Figs. 1 and 2 merely by the sets of coils 27—27′ illustrated for controlling the beam 16; the coils 28—28′ for controlling the beam 17; and, the coils 29—29′ for controlling the beam 18.

It was explained, in the application hereinabove mentioned, that the deflection currents or voltages which are supplied to the various deflection controls for the different component color images shall be appropriately varied in accordance with the image-boundary distortion present, due to the angle of impact or obliquity of the beam, and, to this end, the several deflecting coils, as conventionally represented, are herein indicated in a conventional manner as being suitably connected to beam deflection controls which have not been illustrated.

However, for purposes of explanation, reference may be had to the abovementioned patent No. 2,481,839 which was filed August 5, 1944, as Serial No. 548,238, which describes fully the ways and means for compensating for keystone distortion in both the vertical and the horizontal directions, as well as the combination of vertical and horizontal keystone distortion which results in a partial keystoning in each of two directions so as to make double compensation in one direction of deflection essential. To avoid repetition herein, these systems are not specifically described herein, but it will be understood that in any control system for deflection, suitable compensation must be made for the angle from which the beam is permitted to impinge upon the target area in order to preserve the desired rectangularity of the image area.

From the above discussed showing of Figs. 1 and 2, it will be seen that the present invention contemplates the use of an image producing tube which includes a single target element and an electron-opaque mask or barrier which is appropriately apertured or perforated, and which tube is provided with a plurality of neck portions from which separate electron scanning beams originate. The separate component scanning beams for producing the separate images are all directed toward the target or screen 21 so as to fall under the influence of deflecting fields before passing through the several apertures in the electron-opaque mask or barrier 23 to scan or otherwise influence the target area.

In the arrangement of Fig. 3, two of the assumed component color scanning beams are shown as directed through the orifice or aperture 24 in the electron-opaque mask or barrier element 23, so that the electron beams impinge upon the luminescent material 35 which is coated upon a transparent support area 21. In the arrangement shown by Fig. 3, the electron beam 16, which was assumed to be that emanating from the neck portion 12 of the envelope 11, impacts a section or area 37 on the target surface 21 from which the blue luminescent effects result, while the electron beam 17, which was assumed to be the beam emanating from the neck portion 13 of envelope 11 and which produced the red component color, passes through the aperture or orifice 24 to impinge upon an area 39 which is also a suitable luminescent material adapted to produce the red color effects.

The arrangement of the different areas of luminescent material compounds may be, for instance, as shown schematically by Fig. 4, where the areas 39, when impacted by the electron beam 17, produce the red effects; and the areas 37, when activated by the electron beam 16, produce the blue effects; and the areas 41, when activated by the electron scanning beam 18, produce the green fluorescent effects. It can be seen that this arrangement is more or less in an equilateral triangular form, but other patterns may also be used, as will herein be explained.

While various choices of activating materials which may coat the support surface 21 are possible, suggestions of certain suitable compounds which would luminesce in each of the selected colors were made in U. S. Patent No. 2,310,863, granted on February 9, 1943, to H. W. Leverenz. While reference is made to the patent, for detailed information on the coating material it nevertheless may be stated that to provide the red luminescent effects use may be made of chromium activated aluminum berylliate or zinc cadmium sulphide activated by silver; the blue effects may result from silver activated zinc sulphide, zinc silicate and zirconium silicate; while the green luminescent effects may be provided by alpha-willemite activated with maganese and zinc cadmium sulphide activated with silver, all as explained in the aforesaid Leverenz patent. Thus, further reference will not be made herein to the luminescent material per se.

In the process of forming the luminescent coatings 37, 39 and 41, for instance, upon the support element 21, it will be noted that the areas of the different component surfaces 37, 39 and 41 should be smaller than the scanning line width and, while the arrangement of Fig. 4 is one which indicates one schematic form of arrangement for positioning the separate luminescent compounds, it is to be understood that such an arrangement is purely illustrative and in no way limiting.

For instance, by the addition of a separate control beam within the tube emanating from a separate neck portion, a slightly modified arrangement of the luminescent particles may be provided so that a separate area 43 (Fig. 5), beneath each aperture or orifice 24 in the electron-opaque mask 23, and also, for example, positioned beneath each green responsive area and intermediate each blue responsive area, could be provided to be activated by a separate electron beam in order to produce a desired "key" image in black and white. The luminescent material coating to form the areas 43 would thus be of well known forms, such as have already been disclosed in Leverenz Patent No. 2,274,272, and Kaufmann Patent No. 2,219,929, although other suitable materials might be used. Furthermore, it is also possible to make a slightly different arrangement of the luminescent coating, as is shown more particularly by Fig. 6, where a different assumed relationship of the elements is illustrated. In Fig. 4, the group of primary color luminescent elements forms substantially an equilateral triangle; in Fig. 6 a right-angle triangle, and in Fig. 5 a square.

The manner of forming the coating upon the support surface 21 does not, per se, form a part of the present invention, although it will be discussed briefly in what is to follow as a purely exemplified and illustrative manner of forming the screen. In connection with the disclosure of the invention, however, it is important to note that in the arrangement of the elementary surfaces 37, 39 and 41 for producing the three component color images for tricolor reproduction, it is usually desirable to make provision for scanning one of the areas from a path as closely perpendicular as possible although it is apparent that this depends to a substantial extent upon tube geometry. The important consideration is that the several scanning beams shall be directed through the apertures 24 of the mask plate 23 in such a way as to influence the correct color luminescent area.

Generally speaking, the openings or orifices 24 in the electron-opaque mask 23 should be all of approximately the same size as the elementary color components which are formed upon the target surface 21 and which are positioned behind the electron-opaque mask, so that the electron beam must pass through the apertures of the mask to strike or impinge upon the different luminescent areas. The openings 24 in the mask are usually spaced equal distances apart and in geometric arrangement from the center of the scanned raster, although they may open out or widen slightly toward the edge of the scanned raster due to the increasing obliquity of the passage of the several scanning beams therethrough. However, generally speaking, this effect will be small. It is conditioned upon the location of the electron beam source relative to the target area and, in devices of the nature described, it is important that the effective electron beam sources shall form, in space, a figure which is approximately and on the average homologous with that formed by the centers of the fluorescent component color elements, such as the areas 37, 39 and 41 (Fig. 4) or 37, 39, 41, and 43 (Fig. 5). With an arrangement such as that of Fig. 4, the electron beam sources will be angularly spaced by 120°, whereas with the arrangement of Fig. 5, where a fourth scanning beam is used, the angular separation will be approximately 90°.

From the practical viewpoint, the production of the elementary surfaces which will form the target may be accomplished by appropriately weaving extremely thin wires carrying fluorescent material as an adherent coating. These elementary surfaces can also be produced by utilizing a stencil through the orifices in which the fluorescent material is spread or otherwise deposited. Under such circumstances, after coating the elements of one primary color, the stencil will of course be micrometrically displaced before coating or depositing the next color component of luminescent material which is permitted to settle upon or coat the target surface 21.

In accordance with the suggestions above made, it will be apparent that the general form of luminescent target area suggested, for instance, by Figs. 5 and 6, may readily be obtained from the use of the woven pattern with the red and the blue fluorescent coatings being spaced equidistant from one another on the warp wires, for instance, and alternately positioned, and the green luminescent materials 41 coated upon the woof wires and also spaced equidistant.

It is, of course, apparent that where it is desired to provide a black and white luminescent coating, one or the other of these wires may carry the black and white material in accordance with the pattern of Fig. 5.

If reference is made to Fig. 7, for instance, there will be seen to be disclosed a mask arrangement in the form of a mesh formed from a plurality of warp wires 51, 52, 53, etc, and woof wires 55, 57, 59, etc. Between the several warp and woof wires various apertures or openings 58 60, for instance, are caused to appear. The arrangement of the wires and the openings is such that by positioning the masking area so formed over a support target, such as the target 21 of Fig. 3, for instance, various luminescent materials may be deposited onto the support through the various apertures or openings 58, 60 in the mask.

In one form of the arrangement, if it be desired to provide first a coating on the support surface 21 which shall be arranged in accordance with the pattern arrangement of Fig. 5, it will be apparent that the mask in one position, such as that shown, will provide openings 58 and 60 through which suitable luminescent material to coat areas such as 39 may be deposited in order that the red image may result from electron beam activation. The area 39 will be approximately square when produced by this method. After all of the areas 39 have been formed by depositing the luminescent material coating, the mask is shifted laterally in the direction of the arrow 61 for a distance equal to that represented by $x$ for instance. In such newly positioned arrangement, suitable material to provide green luminescent effects, which would result from coating green responsive areas such as 41 (but approximately square), is deposited upon the support target surface 21 through the same apertures or openings 58, 60, and so on, in the mesh.

Next, with the luminescent material used to produce the red and the green images being assumed to be deposited, the mask is returned to its initial position wherefrom the luminescent material to produce the red image was deposited, and it is then moved downwardly for a distance represented as $y$ on Fig. 7, so that the warp and woof wires now cover the already deposited red and green luminescent material, and blue luminescent material is now deposited through the apertures or openings 58, 60, and so on, in the mesh to coat the target area 21.

So arranged, it is apparent that the coated surface of the target area 21 will now be such that it substantially corresponds to the showing of Fig. 6 except that the coated areas will have an accpetable approximately square shape. However, if it be desired to provide coatings which shall produce the key images such as result from the black and white responsive areas 43, as in Fig. 5, the mask or mesh is moved laterally for a distance corresponding to $x$ from the last named position (above discussed) and luminescent material is then deposited upon the support target surface 21 through the mesh openings 58 and 60, and so on, to form the black and white responsive areas. In this way it can be appreciated that the warp and woof wires of the mesh serve as a mask for depositing the luminescent material, so that if the mask is set tightly adjacent the support target 21 the particular luminescent material which is instantaneously being sprayed or otherwise deposited on the base will fall or settle through the apertures only, and the desired pattern of screen coatings, such as suggested as to arrangements in any of Figs. 1, 4, 5 and 6 will result. However, for the particular arrangement and pattern of motion of the screen above described, it is to be particularly understood that the described arrangement is such as to produce the screens resembling those schematically shown by Figs. 5 and 6.

When the target area coatings are made in accordance with the procedure hereinabove outlined in the discussion of Fig. 7, the coatings of luminescent material generally will be deposited as above outlined. However, it is to be understood that the general relationship of the various color luminescent coatings may be varied within wide limits; and, in accordance with the coatings applied to the particular tube, will depend the signal modulation applied to the electron beams developed within the separate neck portions of the tube, for, obviously, the modulation signals representing blue image components must be applied to that electron beam which is to impact blue areas only and, likewise and similarly, the electron beams which impact the red and the green areas should be signal modulated to reproduce the desired red and green component color images.

If a modification of the arrangement, as disclosed particularly in connection with the showing of Fig. 8, is to be considered, it will be seen that the general formation of the luminescent areas to produce the tricolor luminous effects is substantially like that of Fig. 4, except for the fact that the blue and green areas 37′ and 41′ are adjacent each other, in contrast to the red and the green areas (37, 41) of Fig. 4, and the red area 39′ is then slightly separated or adjacent the abutting areas of the green and the blue sections.

In the arrangement of Fig. 8, due to the fact that the luminescent compounds are assumed to be deposited upon the target area 21 in accordance with the method of Fig. 7, the various luminescent areas are schematically represented more or less in square formation for convenience of illustration. In connection with the showing of Fig. 8, the apertured masking plate is assumed to be located in a position (not shown) immediately above the target area 21 and intermediate the assumed location of the electron beam sources and the target area. More specifically, the apertured plate may be considered as located in such relationship that the centralmost portion of each aperture is approximately in direct line with the point at which all of the red, green and blue areas meet. For convenience of illustration, the dot-dash lines on Fig. 8 represent schematically the paths followed and traced by the electron beams when producing the red, the green and the blue luminescent effects within an area included within the red, green and blue squares 39′, 41′ and 37′ which, in the modification shown, would be a point intermediate the left and right edges of the topmost line of the traced raster.

In a system where three color representations are to be made, and where the various red, green and blue responsive areas are arranged as shown by Fig. 8, the various electron beam sources are positioned 120° apart and the projection in space of the electron beam sources, relative to the different colored areas, is generally as represented by the dot-dash lines on the figure.

In considering this general type of arrangement, it can readily be shown that where a substantially uniform perforated structure is used as the masking element (as shown by all of Figs. 1 through 3), and where the distance of the effective electron beam sources from the target relative to the dimensions of the scanned image area is reasonably large, provision is made so that there is a substantial leeway on the contiguity of adjacent component color elements provided by making the scanning spot dimensions (that is, the spot area of the scanning beam as it impacts the luminescent target area) less than the fluorescent element dimensions so that the obliquity of the scanning relative to the target area becomes of substantially no consequence. Accordingly, the electron beams representative of the several component colors and modulated in accordance therewith may strike the target through the apertures of the masking plate without causing distortion or difficulty or without impacting luminescent areas producing light in different colors than that under the control of which the impacting beam is modulated.

In the modified construction of Fig. 9, a woven pattern has been provided to replace the target surface 21, as shown in Figs. 1 and 2, for instance. Generally speaking, the form of woven target disclosed by Fig. 9 is applicable for use where the produced image is viewed either from the rear surface or from the front surface, in contrast to the general arrangement shown by the tubes of Figs. 1 and 2 where rear viewing is generally to be preferred.

Referring in detail to Fig. 9, various luminescent materials to produce the red, the green and the blue images are arranged to be coated upon a series of transparent tapes or wires, each of a width preferably less than that corresponding to the diameter of each elemental area into which the scanned pattern is assumed to be divided.

In the showing of Fig. 9, it must be borne in mind that the arrangement is in no way drawn to scale and, for purposes of illustration only, the plurality of tapes or wires is shown in such a way that several wires are substantially spaced apart from each other in both horizontal and vertical directions. In actual use, however, the wires or tapes are woven tightly so that no space, or substantially no space exists between any of the wires forming the warp and the roof, or, in other words, no central apertures, such as were indicated in Fig. 7 in the formation of the mask, can result.

Considering the arrangement of Fig. 9 further, the transparent tapes or wires 71 may be formed of any suitable transparent material, such as glass or fibers, or insulators such as mica. To form the tricolor image reproduction screen or target with key images where desired, the wires or tapes 73 may be considered, for instance, as the wires or tapes which are to reproduce the red color image, and the wires or tapes 75 may be considered as the elements upon which the green images shall result. Similarly, the wires or tapes 77 may be assumed as being those upon which the blue color image is to result, while the black and white or key image shall be produced upon the wires or tapes 79.

To form the wire or tape strands for such image production, it will be appreciated that the wires must be substantially completely transparent over areas overlapping or underlapping other wires which are coated at the areas of underlap or overlap. Accordingly, for illustration purposes, in the arrangement of Fig. 9 the luminescent material coatings are assumed to be placed upon the overlap portion of each of the sets of wire strands or tapes, the underlap portion of adjacent tapes or wires being completely free from any luminescent material coating.

To this end, confined within the areas designated by the color designations on the various strands of wire or tape 73 marked within the boundary limits of the rectangular space 81 there will be assumed to be coated suitable luminescent material of the character hereinabove named to produce the red color image when these areas are activated by the so-called red electron beam, or, in other words, the electron beam 17 emanating from the electron gun conventionally designated as 69 (Figs. 1 and 2). Similarly, to produce the green color image, luminescent material of the character hereinabove explained is coated within the areas 83 on the strips or tapes 75 so that when the electron beam 18 from the electron gun 65 (Fig. 2) impinges upon these areas a green color image shall result. In like manner, the strands of wire or tape 77 have coated thereupon suitable luminescent material to produce the blue color image when the electron beam 16, originating from the gun 67 (Fig. 2), impacts the coated areas 85. The strands of wire or tape 79 upon which the key image is to be produced in black and white (where a key image is desired) may have coated within the rectangular areas designated at 87 suitable luminescent material to produce a black and white monochrome image of the foregoing type.

It will be appreciated that the general pattern formation thus resulting corresponds, rather generally speaking, to that hereinabove explained in connection with Fig. 5. It will be noted, however, that the coatings of luminescent material upon any of the strands of wire or tape 73, 75, 77 and 79 are spaced at regular intervals so as to occupy substantially only that area indicated by the drawings in a particular color selected which is representative of the color of the image resulting upon electron beam activation.

Accordingly, it will be seen, with regard to the strands of wires or tapes 73 which reproduce the red image, for instance, that immediately beneath each section coated with luminescent material to produce the red image, the uncoated sections of the strands of wires or tapes to produce the green image are passed. Likewise, the uncoated sections of the strand of wire or tape which produce the red image over the areas 81 is passed as an uncoated section beneath the strands of wire or tape 77 which have the blue responsive luminescent material coated over the areas 85.

Thus, an electron beam impacting a red light producing area will produce only an image in red, and the lack of any other luminescent material beneath the red image permits this color image to pass directly to the view of the observer whether the woven target is viewed from the front or the rear.

Various ways for forming the target in the manner above explained, of course, will become apparent, and among these methods are arrangements for continuously passing a tape in an uncoated state relative to a spray jet adapted to spray the luminescent material over the wire or tape surface, with provisions made for interrupting the spraying operation for predetermined time periods and then starting it again for an equivalent time period, after which the alternations in operation are repeated. In this way, substantially equal-distance coated and uncoated sections of the tape result. Other methods involve the production of the screen or target surface directly with the superpositioning of masking elements to keep the material from coating upon undesired sections or areas of the strands. Other methods, of course, will at once suggest themselves to those skilled in the art.

In any event, where desired, the coated sections of the tapes may themselves act as filters for the particular color image which is to be produced by the addition of a colored material or dye to the coating material, and this will result, in many instances, in increased sharpness of final image production.

With regard to the front viewing as contrasted to the rear viewing, the electron opaque filter may be of any desired transparent type, such as "Lucite" (methyl-methacrylate resin), or molded or perforated glass for instance, where the perforations may be formed by way of etching or drilling and the tinted auxiliary filter may then be formed as a non-gas emitting binder, such as water glass, which will serve to hold the luminescent material to the surface of the tape or wire.

In connection with this type of screen, it of course will be appreciated that not only is segmental coating of the strands of wire or tape both necessary and desirable, but, in addition, accurately registered weaving is essential in order that superpositioning or overlap of luminescent materials which produce different color images shall not result.

Where the screen or target is formed from a series of woven strands of wire or tape, as above explained, the complete woven mesh may be supported, at its edges, in a suitable framework or standard, and the standard may then be suitably held within the evacuated envelope, according to well known methods and practice for mounting and supporting target areas. The complete mesh is preferably under sufficient tension in its mount to hold it flat in the plane of the supporting standard.

When it has been suggested in these specifications that the target area to be impacted by the several electron beams 16, 17 and 18, for instance, shall be such as to produce directly light in the different selected component additive colors, it would be appreciated that instead of coating the target area 21, the materials such as those represented at 37, 39 and 41, for instance, in Figs. 4 and 6 to produce the different color lights directly or to coat these same areas 37, 39 and 41 in the color producing materials and the area 43 in the black and white producing color, all of these areas may be coated with a luminescent material, such as that hereinbefore disclosed in the mentioned Leverenz and Kaufmann Patents 2,274,272 and 2,219,929, respectively, to produce the image in black and white. Similarly, the coatings provided at the areas 37', 39' and 41' of Fig. 8, for instance, may likewise be coated with a similar material also to produce the image in black and white. Then, on the support base or target surface 21 and in the path between the luminescent coating and the observer, suitable gelatinous or other types of primary or corrective color filter elements arranged uniformly in a manner to correspond substantially to the arrangement of the coatings 37, 39 and 41 or 37', 39' and 41', for instance, may be arranged. Corrective color filters are used when the luminescent material produces light of a color which approaches the desired primary, but requires minor correction to create the desired primary or component color. These filters also could be of the so-called Wratten types or their equivalents and would have only the purpose of making the produced light in the region through which they become controlling appear as if it had been produced in the primary color in question. No filter at all need coat that section of the target upon which the black and white monochrome image to be used for the key image is developed.

Also, while it has been shown, for instance, in the tube sections diagrammatically pictured by Figs. 1 and 2 that the target area 21 and its supported material is spaced slightly from the tube wall itself it will, of course, be apparent that by flattening the tube wall, this target area may be placed directly upon the tube wall in any suitable manner, such as that customarily used for depositing luminescent compounds.

It has been shown, by the companion case (U. S. Patent 2,481,839) entitled "Color Television," as hereinabove referred to, and which was filed on August 5, 1944, as Serial No. 548,238, that in systems of the general nature herein disclosed, provision should be made whereby adequate compensation for distortion, due to the scanned pattern, is produced. For instance, it is apparent that the pattern scanned by the so-called red, green, and blue scanning beams will each be slightly different, under normal circumstances, and without compensation, due to the relative angular position of the several scanning beam sources to the target area. Accordingly, the so-called keystoning effect will be different in connection with each of the scanning beams. To compensate for these variances, recourse may be had to the arrangements disclosed in the said companion application in such a way that there is added or subtracted from the voltage or current applied to the appropriate deflecting electrode system for each beam, a controlling voltage or current which serves to add to or substract from that normally provided to energize the deflecting plates or coils, whereby a distorted pattern of scanning is transformed into a substantially rectilinear pattern of scanning.

In view of the relationship between this application and the aforesaid U. S. Patent 2,481,839 which was filed on August 5, 1944, as Serial No. 548,238, it is deemed unnecessary to enter into a detailed description of ways and means by which the aforesaid distortion may be corrected. To this end, reference may be made herein to the aforesaid application for a completion of the details of this compensation since the two forms are essentially and generally similar.

In applying a system of scanning of the character herein disclosed to the transmission end of a system, in contrast to the receiver end as herein particularly exemplified by all of Figs. 1 through 9, for instance, it should be appreciated that an arrangement, following closely the pattern of that explained in the companion application, may be relied upon. To this end, the target area 21 of the tube 11 is generally replaced by an electrode construction of the character known in the art as a mosaic. The target element 21 then consists of a transparent insulating sheet, which is appropriately backed by a conducting layer, usually in the nature of a substantially transparent or semi-transparent silver layer. The side of the insulating plate toward the electron beam sources is then preferably coated with suitable light filters of the chosen component or primary colors which may be arranged in a pattern formation on the surface of the insulating member 21, according to the showing of Fig. 10 and which closely approximates the general arrangement of the luminescent coatings shown by Fig. 8.

Referring now more particularly to the showing of Fig. 10 and the cross sectional arrangement of Fig. 11, the mosaic electrode structure of the camera or transmitting type tube consists essentially of a transparent sheet of insulating material 91, upon the back surface 93 of which will be placed the signal plate portions for the purpose of deriving signal output energy when released by a scanning electron beam. One side 95 of the insulating plate 91 is appropriately covered in known manner with photoelectric material which forms on the mosaic in droplet or globular form so as to provide a great multiplicity of isolated islands or particles of photoelectric material. The exact manner of forming the photoelectric material on an insulating plate or support base for this purpose has been explained in detail in the prior art and, for example, is found to be set forth in United States patent, #2,065,570, granted to S. F. Essig on December 29, 1936.

In the diagrammatic form of illustration shown by Fig. 11, it is assumed that one of the electron scanning beams, shown by Fig. 2 (for instance, the scanning beam 17) is impinging at one area of the photoelectrically coated mosaic surface 97 thereby to release charges which have accumulated thereon, in a previously described manner, when the complete mosaic has been subjected to the influence of a light image.

In connection with the photoelectric material which has been deposited it, of course, is to be understood that it is preferable to select a photoelectric material which has a relatively uniform response throughout the visible spectrum so that the response characteristic is as close to panchromatic as is possible. This is in order to avoid complexities in the fabrication of the tube and the necessity for providing separate photoelectric coatings on areas which are to respond to different color images.

On the other side 93 of the insulating plate 91 provision is made for applying the several signal plates, of which completely independent signal plates are desirable for segregating the signal output of the different component color images.

Where the target is arranged in accordance with the showing of Fig. 10, where the red-responsive areas and the blue-responsive areas predominate (as regards size only) and the green-responsive areas are of lesser size, a convenient arrangement for providing this form of structure is to place light transmitting filter areas, which are of a conducting nature, adjacent the insulating sheet.

As disclosed by Figs. 10 and 11, the filter areas 41 for the green image and the filter areas 37 for the blue image are provided and arranged directly adjacent the insulating sheet. The several component green filtering and signal gathering areas, which pass the light of the green component color image, for instance, are connected one with the other in each assumed line by means of connecting strips 99, whereas the blue filter areas are connected by similar forms of connecting strips 101. The various component sections for the green filter areas, for instance, are then joined by way of conductors 103, which connect all of the several component areas 41 through the connecting links or members 99 to a main output conductor element 105. The output conductor 105 then supplies the released signal output, caused by scanning of the mosaic structure as a whole by the scanning beam 18, for instance, to a signal output circuit (not shown) which amplifies the output signals representative of green in well known manner. Similarly, adjacent the surface 93 of the insulating member 91, the blue component filter areas 37, which are connected one with another by means of the conducting strips 101, all join with feeder conductor 107 which connect the complete group in parallel with an output conductor 109 in a manner similar to the connection for the green filter areas, so that a scanning beam, such as the scanning beam 16 which is assumed to scan the blue areas, shall release to an appropriately connected amplifier circuit a signal output representative of the light values of the blue component color image.

As the complete group of filter areas 41 for the green and 37 the blue, for instance, rest upon the insulating support plate 91, they are electrically separated one from the other by means of suitable insulation of the non-conducting or insulating support 91 and, where overlapping one another, they are separated by means of insulating material, such as a shellac or other appropriate resin or plastic, for instance, which is conventionally represented at 113 (Fig. 11). It will be noted that the actual areas 41 and 37 which pass the separate component color images are not arranged in overlapping formation so that light passing through these filter areas to produce a charge across the insulating sheet or support 91 by virtue of the photoelectric response of the coating 97 is representative of a single color only.

To provide the third component color image, which will herein be assumed to be the red image, the red filter areas 39 are formed in a manner similar to that explained for the green and the blue filters, except that the red filters, in some limited areas, in effect overlap both the green and the blue particularly, for instance, the conducting members 99 joining the green filter areas 41 and the conducting members 101 joining the blue filter areas 37. However, the main filter area 39, which passes the red component color image, is external to the path of light which would normally pass through in the direction shown by the arrow 120 to produce the charge. However, in order that there may be provided a layer of insulating material intermediate the photoelectric coating 97 and the red filter area 39, additional insulating material 117 is preferably provided intermediate the filter area 39 and the photoelectric material 97 so that charges may be built up across the insulator between the conducting filter surface 39 and the photoelectric material 97.

As was explained in connection with the arrangement of the green and the blue filter areas, it is essential that the complete group of red filter areas likewise be connected. To this end and in view of the fact that all of the red filters are herein shown as overlapping the group of connecting elements 101 for connecting the blue filter areas, and 99 for connecting the green areas. the red filters may be formed more in the nature of single units or strips which are positioned in a manner to correspond to or closely approximate the transverse signal scanning paths or lines in which the tube raster is scanned, or, alternatively, the red sections may be arranged more in the nature of columns and thus positioned transversely with regard to the scanning direction. In either instance it is desirable to arrange the complete group of filters so that they connect in parallel by way of conductors 127, for instance, to a common terminal member 129 which, in turn, connects to the appropriately located signal amplifier channel.

In the arrangement illustrated in the drawings, the signal output for the red channel as appearing in the conductor 129, that for the blue channel as appearing in the conductor 109, and that for the green channel as appearing in the conductor 105, are assumed to be supplied to separate amplifiers by way of the well known forms of load resistors. Of course, any form of connection of the signal output, as resulting from the release of the charges which are built up on the mosaic structure (see particularly Fig. 11) may be relied upon.

In this connection it will be seen, from looking at the arrangement of Fig. 10, which is a plan view with the light image assumed to be directed toward the mosaic structure of the tube in a direction substantially normal to the plane of the paper, the filter areas 39 permit the red image to produce charges across the insulating sheet of the target mosaic, the green filter areas 41 similarly permit the building up of a charge image representative of the green components of the viewed image and, likewise, the blue filter areas 37 are assumed to transmit light representative of the blue color components of the image. In this way there is built up across the mosaic, charges which are representative of the different component colors and these are released then by the plurality of independent scanning beams operating simultaneously in a manner similar to that explained in connection with the receiver shown particularly by Figs. 1 and 2. Of course, in connection with the transmitter type of tube, the scanning beams 16, 17 and 18 respectively, which are to impact the surface of the mosaic which has been coated with photosensitive material 97, are intended to restore the condition of equilibrium on the mosaic where the equilibrium conditions have been disturbed by the application of the light image through the filter areas. This is in accordance with well known practice in television operations.

In the instance shown, the filter areas 37, 39 and 41 serve as both the conducting signal plate areas and as the filtering medium, so that separate filtering to segregate the component color images is unnecessary. That is, such areas are both translucent or transparent and of appropriate color, and also semi-conductive.

From what has been above stated, it will be apparent that the capacity intermediate the red filter area 39 and the photoelectric material 97 is different, due to the varying thickness from that between the filter area 41 and the photoelectric material, or the filter area 37 and the photoelectric material. However, to avoid color distortion due to the variance in charge which will be built up in accordance with substantially equal brilliance of light, it is apparent that in the output circuit of the several filters there may be added appropriate capacity so that the actual distributed capacity for any of the colors plus the added external capacity is made substantially equal to a particular value of capacity for each of the colors; or, in the alternative, inductance may be added in series in the lead or conductor to the element having the highest capacity to introduce a suitable phase shift to compensate for the changes in capacity. In adding such external inductances or capacities as here mentioned, care is taken to avoid appreciable changes in the video frequency characteristics of the corresponding circuits.

It is apparent that as long as the wave length of the currents corresponding to the transmitted signal shall be long, as compared to the dimensions of the tube or signal-gathering structures, that reasonable compensation can be effected in the above-mentioned manners. Of course, if it be assumed that the transmission is to be in accordance with any presently accepted scanning standard, with a reasonable size of mosaic, the ratio of the wave length of the video signal currents to the size of the mosaic is of the order of hundreds to 1, and therefore the proposed form of compensation may be made completely adequate.

It must be appreciated, in connection with arrangements of the type shown, that there may be a tendency to produce interaction or cross-talk effects in the scanning or camera tube between the different types of image translating areas for the different component colors due to mutual inductance or mutual capacitance between the component color signal circuits. Such cross-talk or interference effects readily may be neutralized by any well known forms of reversing capacity or inductive coupling arrangements, none of which have been shown herein for reasons of simplification.

The assembly of sub-elemental color-emissive areas which luminesce, under excitation, in respectively different colors, and which are associated with a common mask-aperture (such as 37, 39, 41 of Fig. 4; 37, 39, 41 and 43 of Fig. 5; 37', 39', and 41' of Fig. 8; and 81, 83, 85, 87 of Fig. 9) and the assembly of color-filter areas (such as 37, 39 and 41 co-acting with the photo-electric surface in Fig. 10) associated with a common mask aperture are referred to in certain of the claims as a "cluster," to distinguish them from the "group" or "groups" of single colors called for in the other claims.

It is of course will be apparent that many and various modifications may be practiced within the teachings of the present disclosure and, accordingly, it is to be understood that the hereinafter appended claims are to be construed in accordance therewith.

Having now described the invention, what is claimed and desired to be secured by Letters Patent is the following:

1. An electron-beam tube comprising, a target consisting, effectively, of a multiplicity of systematically arranged clusters of at least three color areas of different color-response characteristics, said color areas having coordinate dimensions both of which are small relative to the overall dimensions of said target, a battery of electron guns corresponding in number to the number of different color areas in a single one of said clusters, said guns being disposed at the corners of a polygon and tilted toward the center of said target for supplying beam electrons to said target along a plurality of angularly related paths which terminate on respectively different ones of the color areas in each cluster, an apertured electrode mounted adjacent to said target and through the apertures of which electrons travel in their transit to said different color areas, the pattern of distribution of the apertures in said apertured electrode corresponding to that of said clusters of color areas on said target.

2. In an electron-image tube of the masked-target variety, a target-assembly comprising the combination with a foundation member having a multiplicity of substantially duplicate clusters of phosphor-covered areas of sub-elemental image-dimensions and of different color-response characteristics disposed on a surface thereof, of a mask mounted in spaced relation with respect to said foundation member and containing a multiplicity of electron-permeable areas of sub-elemental image-dimensions through which electrons may pass in different angular directions to corresponding ones of said sub-elemental phosphor-coated areas.

3. The invention as set forth in claim 2 and wherein the number of sub-elemental electron-permeable areas in said mask corresponds substantially to the number of clusters of sub-elemental phosphor areas on said foundation surface.

4. The invention as set forth in claim 2 and wherein the dimensions and distribution of the sub-elemental electron-permeable areas in said mask provide a masking surface of a pattern that is opaque to electrons which approach said mask at an angle other than the angle of approach which is allotted to a selected one of said sub-elemental phosphor-coated areas.

5. The invention as set forth in claim 2 and wherein said mask comprises a fabric of open-work construction.

6. The invention as set forth in claim 2 and wherein said mask comprises a sheet like member consisting of a material which is transparent to electrons, said sheet being provided on one of its faces with spaced-apart deposits of an electron-impermeable material.

7. An electron image-tube comprising an evacuated envelope having a transparent window and containing an electron-sensitive screen disposed in a position to be viewed through said window, said screen comprising; a foundation surface and a multiplicity of substantially duplicate groups of phosphor covered areas of sub-elemental image-dimensions on said surface, the sub-elemental phosphor areas of a given group each being constituted essentially of a phosphor material capable of emitting light of a color individual to that sub-elemental area, a masking-electrode mounted in spaced relation with respect to said foundation surface and containing a multiplicity of dot-like electron-permeable areas through which electrons may pass in different angular directions to predetermined ones of said sub-elemental phosphor-coated areas, a source of electrons mounted in spaced relation with respect to said masking-electrode, and electron-deflecting means disposed adjacent to the space between said source and said masking-electrode for directing electrons through the permeable areas in said masking electrode from said source in said different angular directions.

8. Apparatus for the production of images in color comprising: an envelope; a substantially planar target electrode positioned within said envelope and including a plurality of groups of similar elemental target areas intersperced with one another, the elemental areas of each of said groups having a color radiation response to electron bombardment which is different from that of the remainder of said groups and having coordinate dimensions both of which are small relative to the overall dimensions of said electrode; an electrode system within said envelope including at least one electron gun for developing a beam of electrons and for directing said beam toward said target electrode; deflection elements responsive to applied sweep signals for scanning said target electrode with said beam; an apertured structure, positioned in said envelope between said electron gun and said target electrode, comprising a structural member of material impervious to electrons provided with a group of apertures having essentially the same configuration as said elemental target areas and having a space distribution such that electrons of said beam projected through said apertures along a given trajectory impinge only on the elemental target areas of one of said groups; and a control electrode included in said electrode system for modulating said beam in accordance with a modulating signal representing a color component of an image corresponding to the color characteristic of said one group of elemental target areas.

9. Apparatus for the production of images in color comprising: an envelope; a substantially planar target electrode positioned within said envelope and including a plurality of groups of similar elemental target areas interspersed with one another in hexagonal array, the elemental areas of each of said groups having a color radiation response to electron bombardment which is different from that of the remainder of said groups and having coordinate dimensions both of which are small relative to the overall dimensions of said electrode; an electrode system within said envelope including at least one electron gun for developing a beam of electrons and for directing said beam toward said target electrode; deflection elements responsive to applied sweep signals for scanning said target electrode with said beam; an apertured structure, positioned in said envelope between said electron gun and said target electrode, comprising a structural member of material impervious to electrons provided with a group of apertures having essentially the same configuration as said elemental target areas and having a space distribution such that electrons of said beam projected through said apertures along a given trajectory impinge only on the elemental target areas of one of said groups; and a control electrode included in said electrode system for modulating said beam in accordance with a modulating signal representing a color component of an image corresponding to the color characteristic of said one group of elemental target areas.

10. Apparatus for the production of images in color comprising: an envelope; a substantially planar target electrode positioned within said envelope and including a plurality of groups of similar elemental target areas of circular configuration interspersed with one another in hexagonal array, the elemental areas of each of said groups having a color radiation response to electron bombardment which is different from that of the remainder of said groups and having coordinate dimensions both of which are small relative to the overall dimensions of said electrode; an electrode system within said envelope including at least one electrode gun for developing a beam of electrons and for directing said beam toward said target electrode; deflection elements responsive to applied sweep signals for scanning said target electrode with said beam; an apertured structure, positioned in said envelope between said electron gun and said target electrode, comprising a structural member of material impervious to electrons provided with a group of apertures having essentially the same configuration as said elemental target areas and having a space distribution such that electrons of said beam projected through said apertures along a given trajectory impinge only on the elemental target areas of one of said groups; and a control electrode included in said electrode system for modulating said beam in accordance with a modulating signal representing a color component of an image corresponding to the color characteristic of said one group of elemental target areas.

11. Apparatus for the production of images in color comprising: an envelope; a substantially planar target electrode positioned within said envelope and including a plurality of groups of similar elemental target areas interspersed with one another, the elemental areas of each of said groups having a color radiation response to electron bombardment which is different from that of the remainder of said groups and having coordinate dimensions both of which are small relative to the overall dimensions of said electrode; an electrode system within said envelope including a corresponding plurality of electron guns for individually developing a beam of electrons and for directing said beams toward said electrode; deflection elements responsive to applied sweep signals for scanning said target electrode with said beams; an apertured structure, positioned in said envelope between said electron guns and said target electrode, comprising a structural member of material impervious to electrons provided with a group of apertures having essentially the same configuration as said elemental target areas and having a space distribution such that electrons of each of said beams projected through said apertures impinge only on the elemental target areas of a particular one of said groups different from the groups subjected to electrons from the others of said beams; and control electrodes included in said electrode system for modulating each of said beams in accordance with a modulating signal representing a color component of an image corresponding to the color characteristic of the particular one of said groups of elemental areas subject to impingement by the respective beams.

12. Apparatus for the production of images in natural color comprising: an envelope; a substantially planar target electrode positioned within said envelope and including three groups of similar elemental target areas interspersed with one another, the elemental areas of each of said groups having a color radiation response to electron bombardment which is different from that of the remainder of said groups and having coordinate dimensions both of which are small relative to the overall dimensions of said electrode; an electrode system within said envelope including three electron guns for individually developing a beam of electrons and for directing said beams toward said electrode; deflection elements responsive to applied sweep signals for scanning said target electrode with said beams; an apertured structure, positioned in said envelope between said electron guns and said target electrode, comprising a structural member of material impervious to electrons provided with a group of apertures having essentially the same configuration as said elemental target areas and having a space distribution such that electrons of each of said beams projected through said apertures impinge only on the elemental target areas of a particular one of said groups different from the groups subjected to electrons from the others of said beams; and control electrodes included in said electrode system for modulating each of said beams in accordance with a modulating signal representing a color component of an image corresponding to the color characteristic of the particular one of said groups of elemental areas subject to impingement by the respective beams.

13. Apparatus for the production of images in natural color comprising: an envelope; a substantially planar target electrode positioned within said envelope and including three groups of similar elemental target areas interspersed with one another to define on the surface of said electrode a series of three-component clusters consisting of one elemental area of each of said groups, the elemental areas of each of said groups having a color radiation response to electron bombardment which is different from that of the remainder of said groups and having coordinate dimensions both of which are small relative to the overall dimensions of said electrode; an electrode system within said envelope including three electron guns for individually developing a beam of electrons and for directing said beams toward said electrode; deflection elements responsive to applied sweep signals for scanning said electrode with said beams; an apertured structure, positioned in said envelope between said electron guns and said target electrode, comprising a structural member of material impervious to electrons provided with a group of apertures having essentially the same configuration as said elemental target areas and having a space distribution such that electrons of each of said beams projected through said apertures impinge only on the elemental target areas of a particular one of said groups different from the groups subjected to electrons from the others of said beams; and control electrodes included in said electrode system for modulating each of said beams in accordance with a modulating signal representing a color component of an image corresponding to the color characteristic of the particular one of said groups of elemental areas subject to impingement by the respective beams.

14. Apparatus for the production of images in natural color comprising: an envelope; a substantially planar target electrode positioned within said envelope and including three groups of similar elemental target areas interspersed with one another to define on the surface of said electrode a periodic series of three-component clusters consisting of one elemental area of each of said groups, the elemental areas of each of said groups having a color radiation response to electron bombardment which is different from that of the remainder of said groups and having coordinate dimensions both of which are small relative to the overall dimensions of said electrode; an electrode system within said envelope including three electron guns for individually developing a beam of electrons and for directing said beams toward said electrode; deflection elements responsive to applied sweep signals for scanning said target electrode with said beams; an apertured structure, positioned in said envelope between said electron guns and said target electrode, comprising a structural member of material impervious to electrons provided with a group of apertures having essentially the same configuration as said elemental target areas and having a space distribution such that electrons of each of said beams projected through said apertures impinge only on the elemental target areas of a particular one of said groups different from the groups subjected to electrons from the others of said beams; and control electrodes included in said electrode system for modulating each of said beams in accordance with a modulating signal representing a color component of an image corresponding to the color characteristic of the particular one of said groups of elemental areas subject to impingement by the respective beams.

15. Apparatus for the production of images in color comprising: an envelope; a substantially planar target electrode positioned within said envelope and including three groups of similar elemental target areas interspersed with one another in hexagonal array to define on the surface of said electrode a series of three-component clusters consisting of one elemental area of each of said groups, the elemental areas of each of said groups having a color radiation response to electron bombardment which is different from that of the remainder of said groups and having coordinate dimensions both of which are small relative to the overall dimensions of said electrode; an electrode system within said envelope including at least one electron gun for developing a beam of electrons and for directing said beam toward said target electrode; deflection elements responsive to applied sweep signals for scanning said target electrode with said beam; an apertured structure, positioned in said envelope between said electron gun and said target electrode, comprising a plate of material impervious to electrons provided with a group of apertures having essentially the same configuration as said elemental target areas and having a space distribution such that electrons of said beam projected through said apertures along a given trajectory impinge only on the elemental target areas of one of said groups; and a control electrode included in said electrode system for modulating said beam in accordance with a modulating signal representing a color component of an image corresponding to the color characteristic of said one group of elemental target areas.

16. Apparatus for the production of images in color comprising: an envelope having an axis of symmetry; a substantially planar target electrode positioned within said envelope approximately normal to said axis of symmetry and including a plurality of groups of similar elemental target areas interlaced with one another, the elemental areas of each of said groups having a color radiation response to electron bombardment which is different from that of the remainder of said groups; an electrode system within said envelope including a corresponding plurality of electron guns symmetrically spaced at equal distances transverse to said axis of symmetry for individually developing a plurality of beams of electrons and for directing said beams toward said electrode; deflection elements responsive to applied sweep signals for scanning said target electrode with said beams; an apertured structure, positioned in said envelope between said electron guns and said target electrode, comprising a structural member of material impervious to electrons provided with a group of apertures having essentially the same configuration as said elemental target areas and having a space distribution such that electrons of each of said beams projected through said apertures impinge only on the elemental target areas of a particular one of said groups different from the groups subjected to electrons from the others of said beams; and control electrodes included in said electrode system for modulating each of said beams in accordance with a modulating signal representing a color component of an image corresponding to the color characteristic of the particular one of said groups of elemental areas subject to impingement by the respective beams.

17. Apparatus for the production of images in color comprising: an envelope; a substantially planar target electrode positioned within said envelope and including three groups of similar elemental target areas interlaced with one another to define on the surface of said electrode a series of three-component clusters consisting of one elemental area of each of said groups; the elemental areas of each of said groups having a color radiation response to electron bombardment which is different from that of the remainder of said groups and having coordinate dimensions both of which are small relative to the overall dimensions of said electrode; an electrode system within said envelope including at least one electron gun for developing a beam of electrons and for directing said beam toward said target electrode; deflection elements responsive to applied sweep signals for scanning said target electrode with said beam in a series of fields of parallel lines such that the width of said clusters as measured in one scanning direction is not substantially greater than the distance between scanning lines; an apertured structure, positioned in said envelope between said electron gun and said target electrode, comprising a structural member of material impervious to electrons provided with a group of apertures having essentially the same configuration as said elemental target areas and having a space distribution such that electrons of said beam projected through said apertures along a given trajectory impinge only on the elemental target areas of one of said groups; and a control electrode included in said electrode system for modulating said beam in accordance with a modulating signal representing a color component of an image corresponding to the color characteristic of said one group of elemental target areas.

18. Apparatus for the production of images in color comprising: an envelope; a substantially planar target electrode positioned within said envelope and including a plurality of groups of similar elemental target areas interspersed with one another, the elemental areas of each of said groups having a color radiation response to electron bombardment which is different from that of the remainder of said groups and having coordinate dimensions both of which are small relative to the overall diminsions of said electrode; an electrode system within said envelope including at least one electron gun for developing a beam of electrons and for directing said beam toward said target electrode; deflection elements responsive to applied sweep signals for scanning said target electrode with said beam; an apertured structure positioned in said envelope between said electron gun and said target electrode, comprising a conductive member impervious to electrons provided with a group of apertures having essentially the same configuration as said elemental target areas and having a space distribution such that electrons of said beam projected through said apertures along a given trajectory impinge only on the elemental target areas of one of said groups; and a control electrode included in said electrode system for modulating said beam in accordance with a modulating signal representing a color component of an image corresponding to the color characteristics of said one group of elemental target areas.

19. Apparatus for the production of images in color comprising: an envelope; a substantially planar target electrode positioned within said envelope and including a plurality of groups of similar elemental target areas interspersed with one another, the elemental areas of each of said groups having a color radiation response to electron bombardment which is different from that of the remainder of said groups and having coordinate dimensions both of which are small relative to the overall dimensions of said electrode, an electrode system within said envelope including at least one electron gun for developing a beam of electrons and for directing said beam toward said target electrode; deflection elements responsive to applied sweep signals for scanning said target electrode with said beam; an apertured structure, positioned in said envelope between said electron gun and said target electrode, comprising a structural member including portions impervious to electrons and including other portions pervious to electrons, having essentially the same configuration as said elemental target areas, and having a space distribution such that electrons of said beam projected through said other portions along a given trajectory impinge only on the elemental target areas of one of said groups; and a control electrode included in said electrode system for modulating said beam in accordance with a modulating signal representing a color component of an image corresponding to the color characteristic of said one group of elemental target areas.

20. An electron tube comprising a target constituting a quasi-focal plane of electron beam impact, said target comprising a group of multiplicities of approximately contiguously positioned sub-elemental area size luminescent particles each systematically located relative to said quasi-focal plane and each of the multiplicities of luminescent particles being light producing and color discriminative as a group under electron beam activation to produce individually selected component color versions of an additive color image, means for developing a plurality of electron scanning beams and for directing the resultant electron beams toward and upon the target from different angular positions, means for scanning the target by the separately produced electron scanning beams, and multiply apertured masking means mounted adjacent to said target for so restricting the scanning of the target by each of the separate electron scanning beams that each beam scans the target to impact the luminescent particles of one group only of the multiplicities of light and color producing particles.

21. A cathode-ray tube comprising an evacuated envelope containing, a substantially planar target surface element, a multiplicity of dot-like color responsive impact elements supported upon the target area of said element and formed of a plurality of materials adapted to effect a response under electron impact which closely approximates predetermined colors of a multicolor additive color system, electron-gun means for developing a plurality of modulatable electron beams each adapted to be directed toward said dot-like elements from directions acutely inclined to a normal to the plane of said target surface so that said beams individually scan said color responsive dot-like surface areas of the target and collectively produce signal responses representative of a plurality of colors, and multiply apertured masking means containing a multiplicity of dot-like apertures in the electron beam paths and approximately adjacent to said target area so that said masking means limits the target area impacted by each electron beam.

22. An electron tube comprising an image target based upon a quasi-focal plane adapted to be impacted by an electron beam substantially focused thereat, a plurality of groups of multiplicities of substantially contiguously located rudimentary target areas systematically spaced relative to said quasi-focal plane, luminescent material coatings on each of said multiplicities of target areas so that areas of each multiplicity radiate light as a group, when activated, in one of a plurality of selected component colors for producing additive color images, electrode means for developing a plurality of electron scanning beams and for directing and focusing said electron beams upon said target areas, deflection elements responsive to applied orthogonal sweep signals for scanning said target areas by said electron scanning beams, and masking means interposed between said target and said electron beam developing means for restricting the scanning of said target by the separate electron scanning beams each to one only of said groups of multiplicities of said rudimentary target areas.

23. An electron tube comprising a light-sensitive target upon which a light image is to be projected, said target being based upon a quasi-focal plane adapted to be impacted by an electron scanning beam substantially focused thereat, said target comprising a plurality of groups of multiplicities of substantially contiguously positioned rudimentary surfaces systematically located relative to said quasi-focal plane, each of said multiplicities of elements being light responsive and color discriminative as a group, when activated, to be operative in relationship to one only of the plurality of selected component colors of an additive color process, means for developing a plurality of electron scanning beams and for directing the resultant electron beams toward and upon said light sensitive target, means for scanning said target by said electron scanning beams, masking means interposed between the electron beam sources and said quasi-focal plane to restrict the scanning of said target by each of said electron scanning beams so that each beam scans one group only of said multiplicities of light and color responsive rudimentary surfaces, and terminal means to derive output signal energy from each of said groups.

24. A cathode ray tube having included therein a target comprising a multiplicity of similar arrays of selectively chromatically responsive dot-like elements, and said dot-like elements being of luminescent material of such composition that when electronically excited, light will be developed in predetermined component colors of an additive color system, means for developing electronic scanning beams to scan said dot-like elements, the number of said scanning beams corresponding to the number of different chromatically responsive component colors forming said target, a masking means containing an array of systematically arranged dot-like apertures, electrode means for modulating each of said electronic beams under the control of signal energy representing different component color versions of a light image, said masking means being located on the beam impact side of said target and in relatively close proximity thereto and so spacially disposed and aligned with the scanning beam sources and the chromatically responsive dot-like elements of said target that as viewed from each one of said beam sources said dot-like mask apertures reveal substantially one only of the component color arrays of chromatically responsive elements on the electron beam receiving target area of said tube.

25. A target element for producing multicolor images within an electron tube where the target is subjected to electron beam impact comprising a woven mesh having transparent warp and woof strands, a coating of luminescent material on only each exposed and overlapping strip area so that adjacent overlapping and exposed areas of the warp and woof strands are each coated with a different luminescent compound to produce light in one component color of an additive color system when excited by electron beams and collectively develop substantially white light.

26. The invention as set forth in claim 25 and wherein said warp and woof strands are composed of transparent colored materials.

27. A mosaic electrode for developing a plurality of signals representative of the several component colors of a multicolor additive system which comprises a substantially transparent insulating support element, a mass of electrically isolated particles of panchromatically responsive light sensitive material and adapted to be light energized, a plurality of signal plate and light filter elements supported on the opposite side of said insulator and interwoven one with another, the said signal plate and light filter elements being of such size and spaced so closely relative to one another that collectively at least one element of each filter and signal plate section is arranged to occupy an area substantially equal to one point of a television image, means for electrically connecting together the elements of each light filter characteristic, means for electrically insulating the filters of one character from filters of each other character at all points of overlap and means to establish electrical connections to each signal plate.

28. An electron tube comprising an envelope having included therein a target element and a plurality of electron beam forming means to develop electron beams to impact said target, a masking means having formed therein an array of systematically arranged dot-like apertures, said masking means being positioned in said envelope on the beam impact side of said target, said target having a coating of a multiplicity of generally similar dot-like arrays of luminescent compounds each of selective chromatic response when excited by said electron beams so as substantially to correspond to predetermined additive component colors of a multicolor system, said masking means and said target element being so geometrically disposed and aligned relative to each other and to said electron beam forming means that viewed from each one of said plurality of electron beams forming means said mask apertures reveal substantially one only of said component color arrays on said target.

29. An electron tube comprising a target structure occupying a quasi-focal plane of electron beam impact, said target comprising a group of multiplicities of approximately contiguously positioned sub-elemental area size electronically responsive elements each systematically located relative to and upon said quasi-focal plane and each individual group of said multiplicities of elements being color active as a group to determine individually selected component color versions of an additive color image, means for developing a plurality of electron scanning beams and for directing said beams toward and upon said target from different angular positions, deflection elements for scanning said target by said electron scanning beams, and multiply apertured masking means for so restricting the scanning of said target by each of said electron scanning beams that each beam scans said target to impact the electronically responsive elements of one group only of said multiplicity of target supported elements.

30. An additive polychrome television device comprising, a screen-plate having a target surface whereupon the polychrome television images are to be developed, electron beam developing apparatus for producing a multiplicity of individual electron scanning beams originating at different altitudes and azimuths relative to each point on said target surface, an electron mask element having electron permeable portions of sub-elemental image-dimensions systematically arranged therein for the electron beams to penetrate to the said target surface, said mask element being placed substantially adjacent to said surface between said surface and the points of origin of the individual electron beams, and color revealing coatings of sub-elemental image-dimensions carried by said target surface and systematically arranged thereon so that with activation of said coatings by said multiplicity of electron beams each beam develops light which is observable in one component color only and the electron permeable portions of said mask permit each developed electron beam to initiate observable light effects in one color only from said coated target surface, and electron beam deflecting elements positioned to cause each separate electron beam to trace substantially like size homologous rasters on said coated target surface.

31. An additive polychrome television device comprising, a plurality of electron guns to produce a multiplicity of individual electron scanning beams, a target element located in spacial relationship to said electron guns to receive said electron scanning beams, a mask element having systematically arranged electron permeable areas of sub-elemental image-dimensions located substantially adjacent to said target element between said target element and the points of origin of said scanning beams, and a multiplicity of different color revealing coatings of sub-elemental image-dimensions carried upon said target element and systematically arranged relative thereto so that with activation of said target coatings by electron beams reaching it the individual component additive selected colors representing each sub-elemental area of the image to be recreated become observable, each of said color revealing coatings being so located relative to said mask and the therewith associated electron gun that each is impacted only by that one of the electron beams which reaches the mask, and electron beam deflecting elements positioned to cause each separate electron beam to trace substantially like size homologous rasters on said target element.

32. An image producing tube comprising a plurality of electron guns to produce a multiplicity of individual electron scanning beams, a target element located in spacial relationship to said electron guns to receive the several produced electron scanning beams, a mask element having systematically arranged electron permeable areas of sub-elemental image-dimensions located substantially adjacent to said target element and placed between said target element and the points of origin of the several scanning beams, and a multicplicity of different color revealing coatings of sub-elemental image-dimensions carried upon the target area and systematically arranged relative thereto so that with activation of said target by electron beams reaching it the individual component additive selected colors representing each sub-elemental area of the image to be recreated become observable, each of said color revealing coatings being so located relative to said mask and the therewith associated electron gun that each is impacted only by that one of said electron beams which reaches said mask.

33. An electron-sensitive image-target comprising a foundation member having a substantially plane surface containing a multiplicity of substantially duplicate clusters of dot-like phosphor-covered areas of sub-elemental image-dimensions, the dot-like sub-elemental phosphor-covered areas comprising a given cluster being each constituted essentially of a phosphor material capable of emitting light of a color individual to that sub-elemental area, each of said clusters of sub-elemental phosphor areas comprising four discrete phosphor dots, one of said dots being constituted of a phosphor material capable of emitting white light.

ALFRED N. GOLDSMITH.

REFERENCES CITED

The following references are of record in the file of this patent:

UNITED STATES PATENTS

| Number | Name | Date |
|---|---|---|
| 1,666,048 | Mees | Apr. 10, 1928 |
| 1,691,324 | Zworykin | Nov. 13, 1928 |
| 1,988,605 | Michelssen | Jan. 22, 1935 |
| 2,280,191 | Hergenrother | Apr. 21, 1942 |
| 2,294,820 | Wilson | Sept. 1, 1942 |
| 2,307,188 | Bedford | Jan. 5, 1943 |
| 2,310,863 | Leverenz | Feb. 9, 1943 |
| 2,386,074 | Sziklai | Oct. 2, 1945 |
| 2,416,056 | Kallmann | Feb. 18, 1947 |
| 2,446,440 | Swedlund | Aug. 3, 1948 |
| 2,446,791 | Schroeder | Aug. 10, 1948 |
| 2,480,848 | Geer | Sept. 6, 1949 |
| 2,481,839 | Goldsmith | Sept. 13, 1949 |

FOREIGN PATENTS

| Number | Country | Date |
|---|---|---|
| 505,653 | Great Britain | May 11, 1939 |
| 866,065 | France | Mar. 31, 1941 |

OTHER REFERENCES

American Annual of Photographic for 1914, page 124.